United States Patent [19]

Roshan et al.

[11] Patent Number: 4,489,039
[45] Date of Patent: Dec. 18, 1984

[54] PALLADIUM-BASED ALLOY

[76] Inventors: Natalia R. Roshan, Yaroslavskoe shosse 57, kv. 36; Natalia I. Parfenova, ulitsa Plescheeva, 1, kv. 73; Viktoria P. Polyakova, ulitsa Trofimova 15, kv. 201; Evgeny M. Savitsky, ulitsa D. Ulyanova, 3, kv. 13; Alexandr P. Mischenko, Teply Stan, 2 mikroraion, korpus 27, kv. 427; Vladimir M. Gryaznov, Lomonosovsky prospekt, 14, kv. 504; Maria E. Sarylova, ulitsa Veshnyakovskava, 6, korpus 3, kv. 142, all of Moscow, U.S.S.R.

[21] Appl. No.: 538,500

[22] Filed: Oct. 3, 1983

Related U.S. Application Data

[63] Continuation of Ser. No. 325,798, Nov. 30, 1981, abandoned.

[51] Int. Cl.$^3$ .............................................. B01D 59/12
[52] U.S. Cl. .................................... 420/463; 55/16
[58] Field of Search ....................... 420/463, 464, 465; 55/16

[56] References Cited

U.S. PATENT DOCUMENTS

| | | | |
|---|---|---|---|
| 3,238,700 | 3/1966 | Cohn | 420/463 |
| 3,713,270 | 1/1973 | Farr et al. | 420/463 |
| 4,063,937 | 12/1977 | Goltsov et al. | 420/463 |

Primary Examiner—L. Dewayne Rutledge
Assistant Examiner—S. Kastler
Attorney, Agent, or Firm—Ladas & Parry

[57] ABSTRACT

A palladium-based alloy comprising ruthenium and a rare-earth element such as lanthanum which has the following composition, percent by mass:

| | |
|---|---|
| ruthenium | 4 to 8 |
| rare-earth element | 0.3 to 8 |
| palladium | the balance. |

The alloy according to the present invention can be useful for purification of hydrogen by diffusion as a catalyst for chemical processes, as well as processes associated with transfer of hydrogen.

1 Claim, 1 Drawing Figure

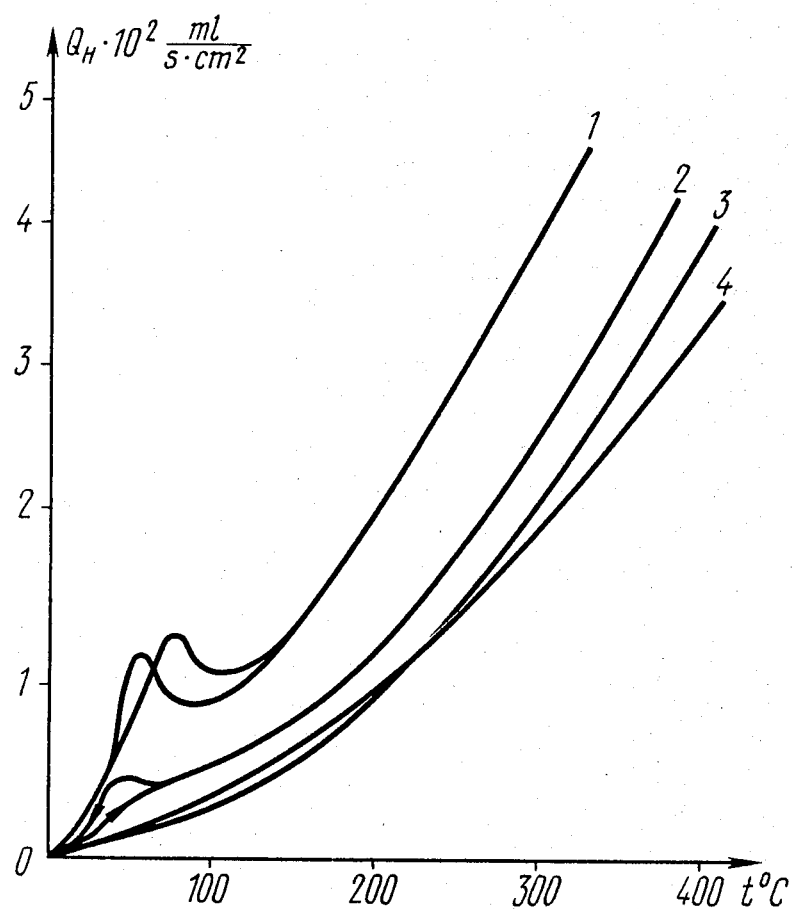

4,489,039

PALLADIUM-BASED ALLOY

This is a continuation of copending application Ser. No. 325,798 filed Nov. 30, 1981 now abandoned.

FIELD OF THE INVENTION

The present invention relates to metallurgy and, more specifically, to alloys of noble metals, more particularly, to palladium-based alloys.

Palladium-based alloys are used as membranes for purification of hydrogen by diffusion, as catalysts in the chemical industry, for processes associated with hydrogen transfer, as well as in medicine, electrical engineering and instrument manufacture as electrodes, thermocouples, electric contacts, potentiometric materials, soldering compositions and the like.

BACKGROUND OF THE INVENTION

To obtain a super-pure hydrogen by way of purification by diffusion of commercial hydrogen or isolation thereof from hydrogen-containing mixtures, use is made of hydrogen-permeable membranes made of palladium and palladium-based alloys. At the present time use is made of alloys containing up to 40% of silver (cf. FRG Pat. No. 2,305,595; U.S. Pat. No. 3,247,648; A. A. Rodina et al. Journal of Physical Chemistry, 1979, No. 5, 1350 /in Russian/).

A maximum hydrogen-permeability is inherent in alloys containing 7.6–9.6% by mass of silver. Also employed are alloys containing 18 to 25% of silver. To obtain a higher stability of the latter alloys, other elements such as indium are incorporated therein. (Cf. A. A. Rodina et al. Journal of Physical Chemistry, 1980, No.6, p.1551).

However, silver-containing alloys are less active in chemical processes associated with hydrogenation and dehydrogenation.

Other palladium-based alloys employed for hydrogen purification and containing gold, copper, boron, nickel, rhodium, cerium, yttrium and platinum either possess an insufficient mechanical strength (e.g. alloys with gold and cooper additions), or get broken under the effect of hydrogen and other aggressive media (cf. A. G. Knapton "Platinum Metals Review", 1977, V21 (2), p.44).

Incorporation into palladium, of additions of gold, copper and likewise silver lowers catalytical activity of palladium in dehydrogenation reactions. Incorporation of platinum additions makes palladium more durable, increases its catalytical activity, but considerably reduces the values of hydrogen-permeability of alloys. Furthermore, in the majority of these alloys two hydride phases $\alpha$ and $\beta$ are formed which when present together lower the selectivity of catalysts made from palladium alloys and serve as the reason of destruction thereof under the effect of hydrogen.

U.S. Pat. No. 3,238,700 Cl. 55–16 (1966) discloses a membrane for purification of hydrogen which is made of a palladium alloy containing 4.5% of ruthenium (by mass). Hydrogen-permeability of this alloy exceeds that of pure palladium, however, this alloy has but a short service life when operated in the atmosphere of hydrogen and hydrocarbon upon multiple cycles of heating and cooling and has a low selectivity in carrying out catalytical processes which is likely to be associated with the presence of two hydride phases ($\alpha$ and $\beta$). During an operation of the membrane there occurs the transition $\alpha \rightleftarrows \beta$ which results in breaking of the membrane. Furthermore, the presence of two hydride phases substantially lowers the selectivity of catalytical processes of hydrogenation and dehydrogenation due to different mechanisms and kinetics of reactions occurring at active centres of these phases.

OBJECT OF THE INVENTION

It is an object of the present invention to provide an alloy based on palladium which would not break in the atmosphere of hydrogen and would make it possible to increase selectivity of catalytical processes.

SUMMARY OF THE INVENTION

This object is accomplished by a palladium-based alloy which, according to the present invention, contains ruthenium and a rare-earth element and has the following composition:

| ruthenium | 4 to 8% by mass |
|---|---|
| rare-earth element | 0.3 to 8% by mass |
| palladium | the balance. |

The alloy of the above-specified composition is more stable in operation; it withstands 4 times greater number of heating-cooling cycles as compared to the prior art alloy containing 5% of ruthenium.

DETAILED DESCRIPTION OF THE INVENTION

As it has been already above-mentioned, the alloy according to the present invention incorporates the following elements, percent by mass: 4–8 of ruthenium, 0.3 to 8 of a rare-earth element, palladium being the balance.

The range of content of ruthenium in the alloys is limited by values of hydrogen-permeability and durability of a particular alloy. Hydrogen-permeability of alloys at a minimum (4%) and maximum (8%) content of ruthenium does not substantially differ from that of an alloy having an optimal composition with 6% of ruthenium (cf. V. M. Gryaznov et al., DAN SSSR, 1973, vol. 211, No.3, p.624). If the content of ruthenium more than 8% hydrogen-permeability of the alloys becomes substantially reduced. The alloys containing more than 10% of ruthenium are already binary ones and become non-processable.

Palladium alloys containing less than 4% of ruthenium, though possessing sufficient hydrogen-permeability, have an insufficient durability in operation in the atmosphere of hydrogen.

The lower limit of the content of the rare-earth element (REE) is defined by the presence of hydride phases. With the REE content below 0.3% by mass there is present a considerable amount of the second hydride $\beta$-phase which is undesirable. With the content of REE above 8% the majority of alloys are binary and non-processable.

Consequently, the violation of the above-specified range of content of ruthenium and REE does not provide the expected results.

Various modifications of palladium alloys according to the present invention are possible.

For alloys containing lanthanum and yttrium the following compositions are recommended as the most efficient for the purposes of high hydrogen-permeability, heat-resistance and selectivity in catalytical processes:

| | |
|---|---|
| ruthenium | 4 to 8% by mass |
| lanthanum | 0.3 to 2% by mass |
| palladium | the balance |
| and | |
| ruthenium | 4 to 8% by mass |
| yttrium | 0.3 to 8% by mass |
| palladium | the balance. |

Alloys of palladium with ruthenium and REE are melted in an electric-arc vacuum furnace with a non-consumable tungsten electrode on a copper water-cooled hearth in the atmosphere of purified helium under an overatmospheric pressure of from 600 to 800 mm Hg. The preliminary vacuum in the furnace chamber is not less than $3.10^{-4}$ mm Hg. The alloying additions of rare-earth metals are introduced into the alloys through an intermediate ligature. The composition of the alloys is controlled by chemical analysis.

All the smelted alloys have a fine-grain structure and are within the range of a solid solution.

Membrane-foils with a thickness of 100 μm are produced from the alloys by the method of cold deformation with intermediate vacuum annealing.

For the measurements of hydrogen-permeability, the thus-made foils are fixed along the periphery in a reactor cell, whereinto hydrogen is introduced from one side. The amount of hydrogen that has passed through the foil is determined chromatographically. During operation the foils are subjected to a cyclic heating at a temperature within the range of from 50° to 400° C.

The accompanying drawing shows a graph of the relationship between hydrogen-permeability and temperature of some palladium alloys, namely: a well known alloy of palladium and (6%) ruthenium (curve 1) and alloys with additions of lanthanum: palladium, ruthenium 6%, lanthanum 0.3%, (curve 2); palladium—6% of ruthenium—lanthanum 0.6% (curve 3) and palladium—ruthenium 6%, lanthanum—1% (curve 4). The arrows at the curves show the directions of temperature variations.

It is seen from the graph that within the investigated temperature range a very insignificant hysteresis is observed in curve 2, whereas it is absent on curves 3 and 4. The absence of hysteresis on hydrogen-permeability curves in alloys of palladium—ruthenium 6%—lanthanum 0.6% and palladium—ruthenium 6%—lanthanum 1% points to the absence of the $\alpha \rightleftarrows \beta$ transition in these alloys in operation of these alloys in the atmosphere of hydrogen or hydrogen-containing media.

The presence, in the alloys, of only one hydride α-phase substantially increases heat-resistance and extends service life of membranes made of these alloys.

Similar values of hydrogen-permeability and the absence of hysteresis in the curves of relationship between hydrogen-permeability and temperature have alloys of palladium-ruthenium with additons of yttrium, cerium, neodymium and samarium.

In carrying-out catalytical processes (hydrogenation of pentadiene and nitrobenzene) the starting feed is supplied into the reactor from one side of the foil membrane under the pressure of vapours of 10 mm Hg, and from the other side—hydrogen under the pressure of 1 atm. The rate of supply of vapours of the starting compounds is 75 ml/min.

EXAMPLE 1

Alloys of palladium with ruthenium and additions of lanthanum, have been produced; their compositions and strength characteristics are shown in Table 1 hereinbelow.

TABLE 1

| Alloy | Alloy composition, % by mass | Hardness Hv kg/mm$^2$ | Tensile strength $\sigma_b$, kg/mm$^2$ |
|---|---|---|---|
| Known | Palladium - 6% of ruthenium | 116 | 60 |
| | Palladium - 6% of ruthenium 0.3% of lanthanum | 126 | 75 |
| of the inven- | Palladium - 6% of ruthenium 0.6% of lanthanum | 140 | 90 |
| tion | Palladium - 6% of ruthenium 1% of lanthanum | 146 | 95 |

It is seen from Table 1 that additions of lanthanum increase the mechanical strength of the known alloy.

Higher selectivity of the catalytical process on the membrane from alloy with lanthanum addition is shown in reaction of pentadiene hydrogenation. The process parameters are shown in Table 2 hereinbelow.

TABLE 2

| Alloy | Alloy composition, percent by mass | T-re, °C. | Reaction products, % | | | |
|---|---|---|---|---|---|---|
| 1 | 2 | 3 | pentane | pentene-1 | pentene-2 | pentadiene |
| Known | Palladium - 6% of ruthenium | 50 | 53 | 2 | 11 | the balance |
| | | 120 | 23 | 2.5 | 74.5 | none |
| of the inven- tion | Palladium - 6% of ruthenium 1% of lanthanum | 50 | 0.8 | 11.5 | 38 | the balance |
| | | 120 | none | 28 | 72 | none |

In the reaction of hydrogenation of pentadiene at the temperature of 120° C. the membrane of a palladium alloy with 6% of ruthenium withstands 150 thermal cycles of heating and cooling; the membrane of a palladium alloy with 6% of ruthenium and 0.3% of lanthanum—500 cycles, while membranes made of alloys of palladium with 6% of ruthenium—0.6% of lanthanum and palladium—6% of ruthenium and 1% of lanthanum remain unbroken during the entire operation period (800 cycles).

EXAMPLE 2

Alloys of palladium with ruthenium and additions of yttrium have been produced; their compositions and strength characteristics are shown in Table 3 hereinbelow

TABLE 3

| Alloy | Alloy composition, % by mass | Hardness, Hv, kg/mm$^2$ | Tensile strength $\sigma_b$, kg/mm$^2$ |
|---|---|---|---|
| 1 | 2 | 3 | 4 |
| known | Palladium - 6% of ruthenium | 116 | 60 |
| of the inven- tion | Palladium - 6% of ruthenium 0.3% of yttrium | 131 | 78 |
| of the inven- | Palladium - 6% of ruthenium 1% of yttrium | 148 | 98 |

TABLE 3-continued

| Alloy 1 | Alloy composition, % by mass 2 | Hardness, Hv, kg/mm² 3 | Tensile strength $\sigma_t$, kg/mm² 4 |
|---|---|---|---|
| tion of the invention | Palladium - 6% of ruthenium 2% of yttrium | 154 | 118 |
| of the invention | Palladium - 4% of ruthenium 8% of yttrium | 134 | 102 |

It is seen that the addition of yttrium increases the mechanical strength of the known alloy.

Improvement of the selectivity of a catalytical process on membranes from alloys with additions of yttrium is shown in hydrogenation of nitrobenzene. The process characteristics are shown in Table 4 hereinbelow.

TABLE 4

| Alloy 1 | Alloy composition, % by mass 2 | T-re, °C. 3 | Reaction products, % by mass | | | |
|---|---|---|---|---|---|---|
| | | | aniline | nitroso-benzene | cyclohex-ylamine | nitrobenzene |
| known | Palladium - 6% of ruthenium | 170 | 66 | 2 | 12 | 20 |
| | | 250 | 72 | traces | 28 | none |
| of the invention | Palladium - 6% of ruthenium 0.3% of yttrium | 170 | 69 | traces | 8 | 23 |
| | | 250 | 78 | none | 22 | none |
| | Palladium - 6% of ruthenium 1% of yttrium | 170 | 85 | none | 4 | 11 |
| | | 250 | 100 | — | — | — |
| | Palladium - 6% of ruthenium 2% of yttrium | 170 | 93 | none | none | 7 |
| | | 250 | 100 | — | — | — |

The alloy containing palladium, 6% of ruthenium and 2% of yttrium in this reaction at the temperature of 250° C. withstands by 4 times greater number of cycles than the alloy comprising palladium and 6% of ruthenium.

The addition of yttrium increase the mechanical strength, heat-resistance and selectivity of the prior art alloy.

EXAMPLE 3

In much the same manner there have been prepared alloys of palladium with ruthenium and additions of cerium, neodymium and samarium; their compositions and mechanical strength characteristics are shown in the following Table 5.

TABLE 5

| Alloy | Alloy composition, % by mass | Hardness, kg/mm² | Tensile strength, kg/mm² |
|---|---|---|---|
| Known | Palladium - 6% of ruthenium | 116 | 60 |
| of the invention | Palladium - 6% of ruthenium 1% of cerium | 138 | 86 |
| of the invention | Palladium - 6% of ruthenium 5% of cerium | 162 | 104 |
| of the invention | Palladium - 6% of ruthenium 2% of neodymium | 146 | 92 |
| of the invention | Palladium - 6% of ruthenium 2% of samarium | 140 | 89 |
| of the invention | Palladium - 6% of ruthenium 7% of samarium | 170 | 132 |

Additions of cerium, neodymium and samarium increase the mechanical strength of palladium and, likewise lanthanum and yttrium, enhance the heat-resistance and extend the service life of membranes made of these alloys, as well as improve the selectivity of catalytical processes carried out on them.

What is claimed is:

1. A palladium based alloy consisting essentially of rethenium and yttrium in the following amounts, percent by mass:

| ruthenium | 4 to 8 |
| yttrium | 1 to 8 |
| palladium | the balance |

* * * * *